L. C. HAMEL.
POWER TRANSMISSION DEVICE.
APPLICATION FILED MAR. 18, 1914.
1,146,495.
Patented July 13, 1915.
2 SHEETS—SHEET 1.
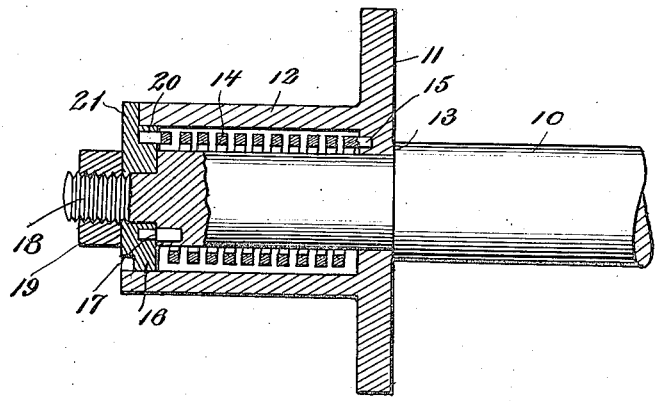
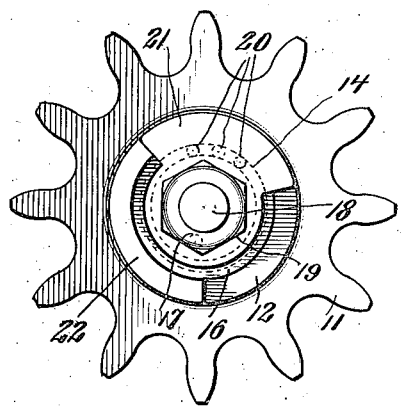
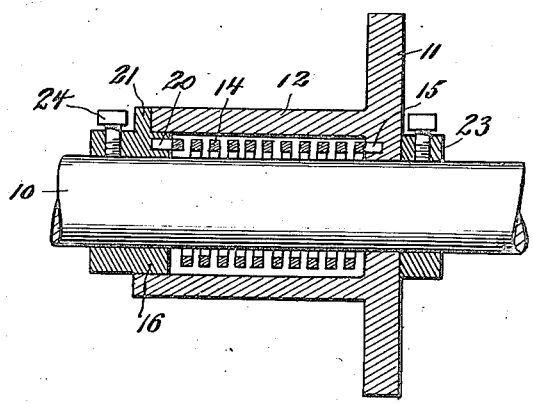
Witnesses
F. C. Barry
M. C. Lucas
Inventor
LOUIS C. HAMEL
By Max A. Schmidt
Attorney.

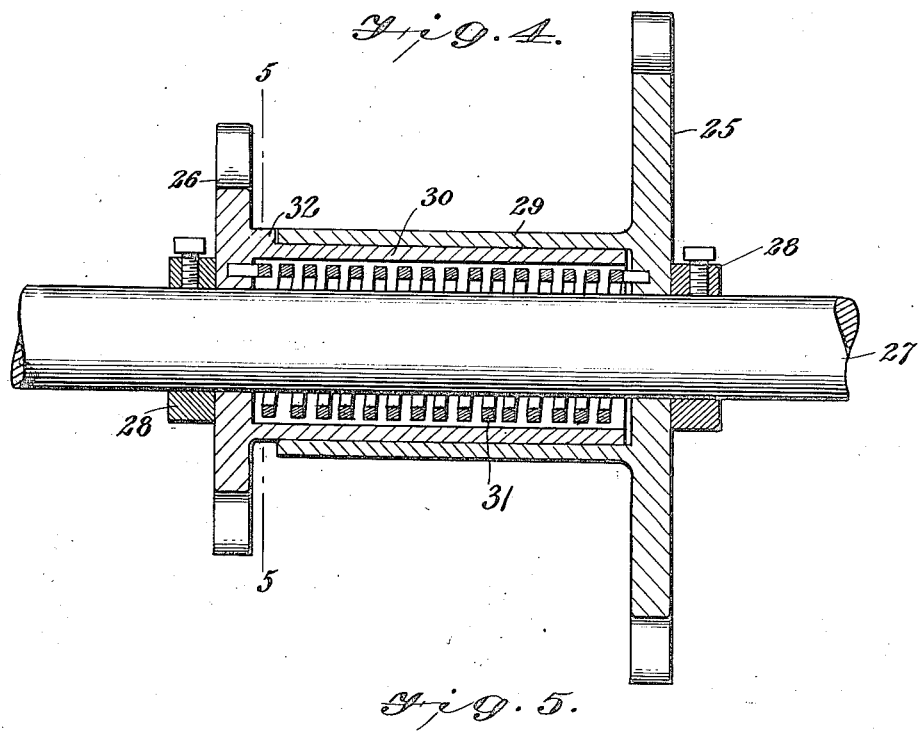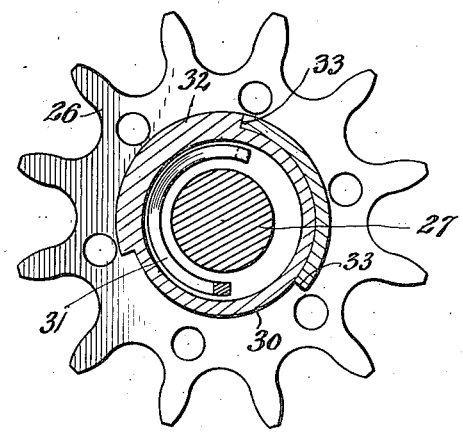

UNITED STATES PATENT OFFICE.

LOUIS C. HAMEL, OF APPLETON, WISCONSIN.

POWER-TRANSMISSION DEVICE.

1,146,495.        Specification of Letters Patent.        Patented July 13, 1915.

Application filed March 18, 1914. Serial No. 825,662.

*To all whom it may concern:*

Be it known that I, LOUIS C. HAMEL, a citizen of the United States, residing at Appleton, in the county of Outagamie and State of Wisconsin, have invented certain new and useful Improvements in Power-Transmission Devices, of which the following is a specification.

This invention relates to driving gears in which a resilient driving connection is interposed between the driving and the driven members, for the purpose of absorbing shocks or jerks from the sudden application of power to the driving member.

The invention has for its object to provide a simple and efficient device of the kind stated, and to this end it consists in a novel combination and arrangement of parts to be hereinafter described and claimed, reference being had to the accompanying drawing in which—

Figure 1 is a longitudinal section showing one form of the device; Fig. 2 is an end view thereof; Fig. 3 is a longitudinal section showing another embodiment of the invention; Fig. 4 is a similar view showing still another modification, and Fig. 5 is a section on the line 5—5 of Fig. 4.

In carrying out the present invention, there is provided a driving member and a driven member having a resilient driving connection. As shown in Figs. 1 and 2, one of the members is a shaft 10 carrying the other member, which latter may be a sprocket wheel, pulley, gear or similar member 11 having on one side an elongated hub extension 12, the internal diameter of which is greater than the diameter of the shaft. The other side of the member 11 abuts against a shoulder 13 on the shaft 10. The hub extension 12 forms a housing for a coiled spring 14 which is the resilient driving connection between the members 10 and 11, said spring surrounding the shaft and being made fast at one end to the inner end of the housing, as indicated at 15. The outer end of the housing is closed by a disk 16 which serves as a means for anchoring the other end of the spring. The disk is pinned to the shaft 10 as indicated at 17. The outer end of the shaft has a reduced, threaded portion 18 passing through the disk and projecting therefrom, on which projecting end, and against the outer face of the disk, is screwed a nut 19, whereby the disk is rigidly fastened on the shaft. On the inner face of the disk are apertures 20, into a selected one of which the outer end of the spring is adapted to be seated. A series of apertures is provided in order that the tension of the spring may be adjusted. The disk 16 seats in the outer end of the housing 12 and has a segmental lug 21 on its outer face. The outer end of the housing is cut away to form a recess to accommodate the lug, the remaining end portion of the housing forming an arcuate stop abutment 22 between the ends of which the lug is located. The spring 14 provides a resilient driving connection between the shaft 10 and the member 11 and absorbs all shocks and jerks, the relative movement of the parts being limited by the lug 21 and the abutment 22. Longitudinal movement of the member 11 on the shaft is prevented by the shoulder 13 and the disk 16.

Fig. 3 shows a slightly modified structure in which the shaft 10 is devoid of a shoulder, but carries a set collar 23 on one side of the member 11 and the disk 16 is secured to the shaft by a set screw 24.

Fig. 4 shows two gear wheels, sprocket wheels, pulleys or other members 25 and 26, respectively, mounted on a stationary shaft 27 between set collars 28. Each member has an elongated hub extension on one side, the hub extension of the member 25 being indicated at 29 and that of the member 26 at 30. The hub extensions project toward and overlap each other, the extension 30 being on the inside and serving as a housing for a spring 31 coiled around the shaft 27 and connected at one end to the member 25 and at the other end to the member 26. These members are thus resiliently or yieldingly connected, the motion of one being transmitted by the spring to the other, thereby taking up all shocks and jerks.

On the inner face of the member 26 is a lug 32 which is located between two stop shoulders 33 formed by cutting a recess in the end of the hub extension 29. These parts limit the relative movement of the members 25 and 26 in the same manner as the lug 21 and the abutment 22 hereinbefore described. The lug 32 is normally in contact with one of the shoulders 33, and when power is applied to one of the members, the lug moves against the tension of the spring toward the other shoulder, and upon coming in contact therewith establishes a positive driving connection between the members.

I claim:

1. The combination of a stationary shaft, a driving and a driven member loosely mounted on said shaft, and spaced laterally, the opposite sides of said members having elongated hub extensions fitting loosely one within the other, and a spring coiled around the shaft, and connected at its ends to the driving and the driven members respectively, the internal diameter of the inner hub extension being greater than the diameter of the shaft, to accommodate the spring, the member which has said inner hub extension being provided with a lug, said lug being opposite the end of the hub extension of the other member, said last-mentioned hub extension having an end recess the ends of which form stop shoulders between which the aforesaid lug is located.

2. The combination with a driving and a driven member, one of said members having a hub extension on one side through which the other member passes, the outer end of said hub extension having a recess, and the second-mentioned member having a portion opposite the recessed end of the hub extension and carrying a lug which extends into the recess, means for holding the members against endwise separation, and a resilient driving connection between the members, said connection being located in the hub extension.

3. The combination with a driving and a driven member, one of said members having a hub extension on one side through which the other member passes, the outer end of said hub extension having a recess, and the second-mentioned member having a portion opposite the recessed end of the hub extension and carrying a lug which extends into the recess, said portion also having a series of apertures on its inner face, and a spring inclosed in the hub extension and secured at one end to one of the members and at its other end in one of the aforesaid apertures.

In testimony whereof I affix my signature in presence of two witnesses.

LOUIS C. HAMEL.

Witnesses:
P. T. HACHBERT,
B. J. ZSUPSKI.